US008984562B2

(12) United States Patent
Charania et al.

(10) Patent No.: US 8,984,562 B2
(45) Date of Patent: Mar. 17, 2015

(54) METHOD AND APPARATUS FOR INTERACTING WITH A SET-TOP BOX USING WIDGETS

(75) Inventors: Rahim Charania, Euless, TX (US);
Ashutosh Sureka, Irving, TX (US);
Michael J. Naggar, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 326 days.

(21) Appl. No.: 13/005,678

(22) Filed: Jan. 13, 2011

(65) Prior Publication Data

US 2012/0185886 A1    Jul. 19, 2012

(51) Int. Cl.
G06F 3/00       (2006.01)
G06F 13/00      (2006.01)
H04N 5/445      (2011.01)
H04N 21/431     (2011.01)
H04N 21/478     (2011.01)
H04N 21/81      (2011.01)

(52) U.S. Cl.
CPC ..... *H04N 21/4312* (2013.01); *H04N 21/47815* (2013.01); *H04N 21/8173* (2013.01)
USPC ......... 725/60; 725/2; 725/42; 725/43; 725/50

(58) Field of Classification Search
USPC ...................... 725/2, 42, 43, 50, 60
See application file for complete search history.

(56) References Cited

U.S. PATENT DOCUMENTS

| 5,027,400 | A | * | 6/1991 | Baji et al. .................... 725/116 |
| 6,421,748 | B1 | * | 7/2002 | Lin et al. ........................ 710/65 |
| 7,133,837 | B1 | * | 11/2006 | Barnes, Jr. ................. 705/26.81 |
| 2004/0003406 | A1 | * | 1/2004 | Billmaier ...................... 725/60 |
| 2006/0095327 | A1 | * | 5/2006 | Vaughn et al. ................. 705/14 |
| 2007/0220540 | A1 | * | 9/2007 | Walker et al. ................. 725/14 |
| 2011/0213655 | A1 | * | 9/2011 | Henkin et al. ............ 705/14.49 |

\* cited by examiner

*Primary Examiner* — Dominic D Saltarelli

(57) ABSTRACT

An approach is provided for enabling direct user interaction with specific items of content as presented by a content delivery system. Content is presented via a set-top box concurrently with a widget, indicating one or more items specified in content. User input relating to selection of one of the items is received. An interactive platform, in response to the input, generates a request specifying the selected item for purchase.

20 Claims, 10 Drawing Sheets

US 8,984,562 B2

METHOD AND APPARATUS FOR INTERACTING WITH A SET-TOP BOX USING WIDGETS

BACKGROUND INFORMATION

With the advent of computers, interactive electronic communications, and the Internet, as well as advances in the digital realm of consumer information, has come a reinvention of conventional entertainment and communication services to enhance programming, recording, and viewing of multimedia, such as broadcast television programs. Traditionally, broadcast media, being based on pre-computer age technology, has developed on its own path, without any regard to other media systems. With readily available, cost-effective broadband services, bandwidth intensive applications, such as audio and video streaming, have become viable mediums. Unfortunately, little or no effort has been put forth to converge these distinct paths or enable seamless integration between traditional broadcast systems and broadband data networks to provide more robust content delivery systems. Furthermore, lack of convergence of these systems limits the user's experience of direct interactivity with their content delivery system.

Therefore, there is a need for an approach that can efficiently and effectively provide support for direct user interaction with specific items of content as presented by a content delivery system.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for interacting with a set-top box using widgets are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a set-top box (STB), it is contemplated that these embodiments have applicability to any device capable of processing content (e.g., audio/video (AV)) signals for presentation to a user, such as a home communication terminal (HCT), a digital home communication terminal (DHCT), a stand-alone personal video recorder (PVR), a television set, a digital video disc (DVD) player, a video-enabled phone, an audio/video-enabled personal digital assistant (PDA), and/or a personal computer (PC) or media presentation device, as well as other like technologies and customer premises equipment (CPE).

Figure 1:
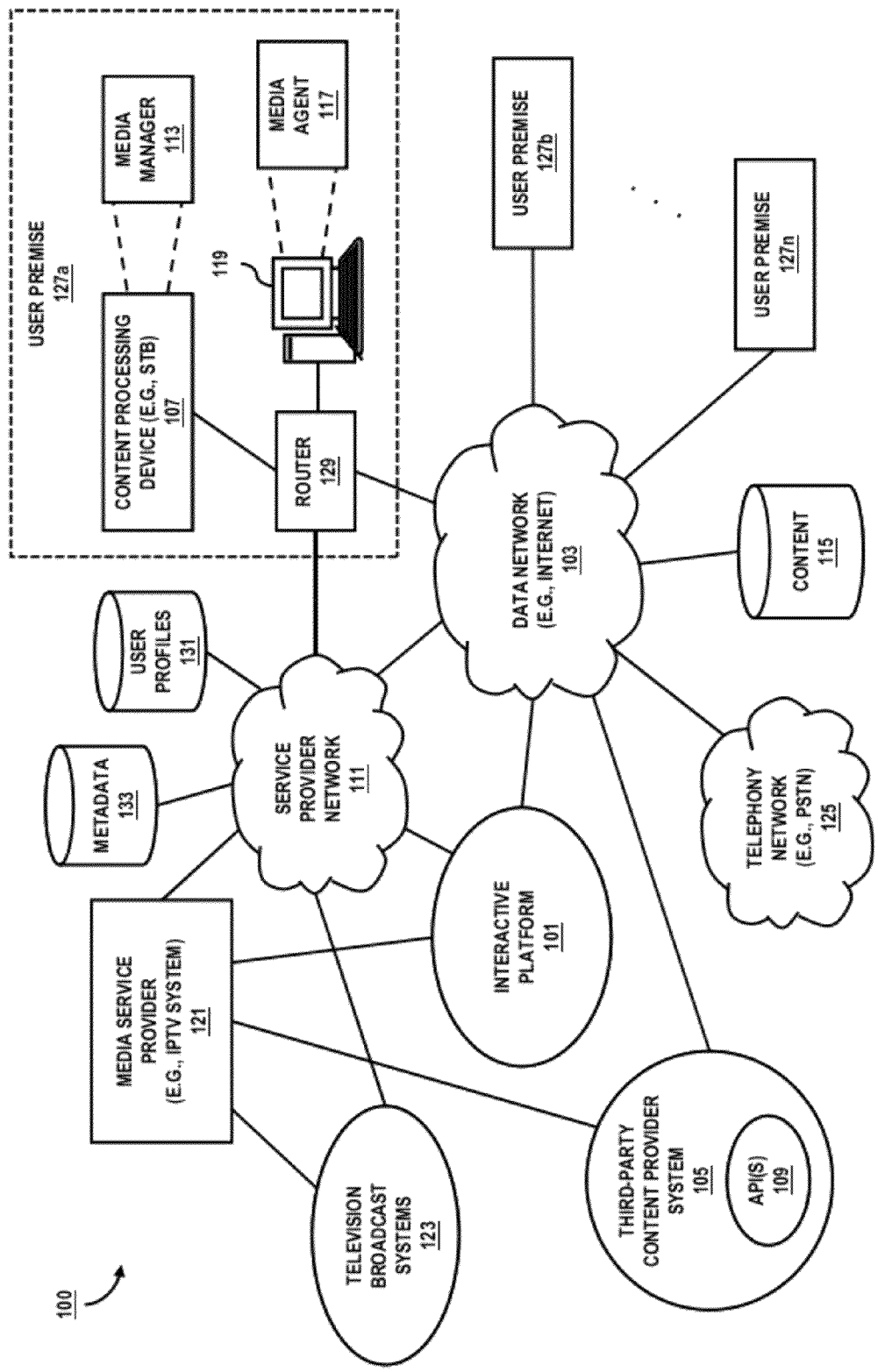
FIG. 1 is a diagram of a system capable of providing direct user interaction with specific items presented within media content, according to an exemplary embodiment.

FIG. 1 is a diagram of a system capable of providing direct user interaction with content as presented within media content, according to an exemplary embodiment. For the purposes of illustration, system 100 is described with respect to interactive platform 101 that is configured to enable dynamic user interaction with a virtual environment concurrent with the presentation of television broadcast content (e.g., paid or public signals) or media/multimedia content (e.g., audio, video and/or images). Traditionally, content is made available to consumers over one or more data networks 103 (e.g., the Internet) by third-party content providers 105. In this manner, system 100 may be configured to support an application or process (e.g., widget) for interaction by a user with content through use of the interactive platform 101. In certain embodiments, a widget is a user interface element (e.g., graphical user interface (GUI) element) that provides an interaction point for processing data. The widget can be operable concurrently with a corresponding content processing device 107, such as (set top boxes) STBs.

In accordance with an embodiment, a subscriber or user of a content delivery service—i.e., cable television or media subscription service—can seamlessly select one or more items presented as content to interact with in a virtual environment through activation of the widget. The widget, presented to the user via the STB as a virtual device that overlays at least a portion of the content as presented on screen, further enables various opportunities for the user to alter, modify or otherwise engage with a selected item within the environment. Alternatively, the widget is positioned in a separate frame from the content as presented to the display, so as to not overlay any portion of the content. Either implementation is suitable for implementation with respect to the embodiments presented herein. User interaction with the widget, which itself provides user access to an interactive platform in association with a content delivery system, can be facilitated by way of physical push-buttons of the STB or peripheral devices thereof, or remote control access to a media manager or media agent.

In addition, the widget features various functions that enable the user to communicate with others, including vendors, as well as engage in purchase transactions with a vendor associated with a particular item. So, for example, a user watching their favorite sitcom as it is broadcast (presented) via their STB can press a button of the widget to purchase clothes, accessories, furnishings or any other items presented during the show. In addition, they can capture an image or snapshot of the content, communicate with a third party in relation one or more items as presented, receive information about the item, etc. The user may select a single or multiple items presented as content and view and interact with a representation of the items in the virtual environment as activated by way of the widget.

In addition to the exemplary uses described above, additional ways of enabling engagement of items (or representations thereof) within the virtual environment via the widget in connection with the STB may include enabling the placement of clothing items as worn by a particular actor- on virtual mannequins, a user customized avatar or other virtual object. The virtual object respective to the clothing item, which may also be displayed as a virtual representation of the clothing item as broadcast, can then, for example, be rotated 360 degrees to enable full viewing by the user. In addition, mannequins or avatar characteristics may be modified by inputting waist, height, and other physical characteristics to more closely resemble the user of the STB.

Furthermore, the arrangement can enable the viewing of household fixtures, e.g., a sofa, as featured in a broadcast to be viewed in a virtual living area depicted in the virtual environment to match the surroundings of the user. The user can adapt wall colors, dimensions, orientation and other characteristics relative to the sofa so as to entertain various possibilities respective to the item. As a further means of interaction or engagement, the user may choose to place any selected item(s)—i.e., clothing, sofa—in a virtual shopping cart in which to carry out a purchase transaction. Alternatively, the user may initiate multiple shopping carts for comparison purposes that can be maintained for a period of time. It is contemplated that numerous other interactive examples are possible. In this manner, the virtual environment can provide user engagement with the items in a manner suitable for facilitating and aiding the purchase process. As will be discussed in a later, the widget may also enable a user to interact with content for purposes other than purchase transactions, i.e., research, general inquiries, etc. More regarding the capabilities of the widget as it operates with respect to and concurrent with a STB is presented with respect to FIGS. 6A and 6B.

According to other exemplary embodiments, platform 101 may be configured to interface with one or more application programming interfaces (API) 109 of one or more third-party content provider systems 105 in order to facilitate subscriber interaction with their corresponding subscriber accounts associated with these third-party content provider systems 105. Still further, broadcasters and content programmers may provide the third-party content providers with specialized APIs suitable for enhancing the user's ability to interact with presented content in the context of specific television programming options. In this manner, platform 101 may interact with content-based services of third-party content provider systems 105 in ways that facilitate maximum engagement of the user, content and vendors or affiliates associated therewith. While specific reference will be made hereto, it is contemplated that system 100 may embody many forms and include multiple and/or alternative components and facilities.

It is observed that television remains the prevalent global medium for accessing entertainment and information-based content sources, as individuals spend a great deal of time tuning into televised media. Furthermore, television is still the predominant means of marketing goods and services, oftentimes being used as a platform to present the newest or reflect the current trends of the day. On demand shopping networks, infomercials, telethons, commercials and other forms of advertisement supported by way of direct broadcasting do not support on demand interaction with the item being advertised. Moreover, while effective, the ability of the user to exercise full discretion over the items they want to pursue for on demand purchase is limited. For example, if a shopping network is directed towards the presentation of content that includes a designer handbag for purchase as presented by a hand model, the user does not have the ability to select the bracelet as worn by the hand model as being of interest to them. Hence, users are generally limited in their ability to selectively account for items of interest to them, let alone control the context, mode or nature of the interaction. It is noted, however, that as the sophistication of today's content delivery systems and services increases, so too will user demand for increased control and interaction with select items of content, especially for the purposes of facilitating consumption of the items.

For example, internet protocol television (IPTV) service providers currently offer subscribers various content-based services ranging from multi-channel video programming that mimics traditional broadcast television, to true video-on-demand (VOD) programming. These services are further supplemented with interactive video applications that enable robust programming information, selection and navigation functionality, as well as integrated digital video recording and data services that enhance the video experience. Subsequently, it is recognized that convenient access to third-party content provider systems will inevitably pave the way for new value-added services made available through conventional broadcast content provider infrastructures. Thus, the approach of system 100, according to certain exemplary embodiments, stems from the recognition that consumers can benefit from the ability to engage via, for instance, STB-based environments, items as selected from content on demand.

As such, system 100 includes service provider network 111 that is configured to integrate television-based media with that of the telecommunications, computing, and associated media environments, thereby broadening the scope of sources and technology available to consumers for interacting with media and/or multimedia content—hereinafter, collectively referred to as "media content." In this manner, system 100 allows content as presented within a broadcast to be interacted with via any suitable content processing device 107, e.g., an STB. According to exemplary embodiments, media manager 113, which is implemented by content processing device 107, includes one or more computer program instructions (or code) that may be stored to, for example, one or more computer-readable mediums, e.g., one or more memories (not shown), of content processing device 107, that when executed by, for example, one or more processors (not illustrated) of content processing device 107, are configured to cause content processing device 107 at least to present content streamed from one or more third-party sources (e.g., third-party content provider system 105, content repository 115, etc.) available over one or more data networks 103 by, for instance, media agent 117.

In this manner, media agent 117, which may be implemented by computing device 119, may also include one or more computer program instructions (or code) that may be stored to, for instance, one or more computer-readable mediums, e.g., one or more memories (not illustrated), of computing device 119, that when executed by, for example, one or more processors (not shown) of computing device 119, are configured to cause computing device 119 to retrieve content from the one or more third party sources, such as third-party content provider system 105, content repository 115, and the like, and stream the retrieved content to media manager 113 for presentation via content processing device 107. It is noted that media agent 117 may be configured to transcode (or otherwise convert) the retrieved content from a first format to a second format before or during streaming of the retrieved content to content processing device 107. This stream of content is referred to, herein, as a "virtual channel" of content.

In other exemplary embodiments, media manager 113 and/or media agent 117 may, when executed by, for instance, the one or more respective processors of content processing device 107 and/or computing device 119, be configured to cause content processing device 107 and/or computing device 119 to enable users to interface with platform 101 in order to easily, effectively, and intuitively select items to with over one or more data networks 103 for presentation via content processing device 107 as one or more virtual channels of content. Still further, media manager 113 and/or media agent 117 may, when executed by, for instance, the one or more respective processors of content processing device 107 and/or computing device 119, be configured to cause content processing device 107 and/or computing device 119 to enable users to access and, thereby, interact with one or more features associated with subscriber accounts corresponding to these third-party content provider systems 105. As such, embodiments of the service provider network 111 may also enable individuals utilizing content processing devices 107 to interact with one another, through personalized communications channels, to further facilitate the processes described herein.

As used herein, media content broadly includes any audio-visual content (e.g., broadcast television programs, VOD programs, pay-per-view programs, IPTV feeds, DVD related content, etc.), pre-recorded media content, data communication services content (e.g., commercials, advertisements, videos, movies, songs, images, sounds, etc.), Internet services content (streamed audio, video, or image media), and/or any other equivalent media form. In this manner, MSP 121 may provide (in addition to their own media content) content obtained from sources, such as one or more television broadcast systems 123, one or more third-party content provider systems 105, content residing in a networked repository 115, etc., as well as content available via one or more data networks 103 or telephony networks 125, etc.

MSP 121 can provide media content that is retrieved over data network(s) 103, as well as provide conventional media streams. For instance, MSP 121 may provide "virtual channels" to content traditionally limited to third-party content provider systems 105, such as host sites, e.g., end user originated content uploaded to and, thereby, shared via audio, video, and/or image sharing sites. Additionally, the media content may include streamed audio and/or video from conventional broadcast providers.

Media manager 113 and media agent 117 may be executable, for example, as one or more user interfaces capable of local implementation on content processing device 107 or on a computing device 119, such as a computer, telephony device, mobile device, and/or any other like user device. Thus, exemplary embodiments of media manager 113 and media agent 117 may be provided through navigation shell applications, e.g., menu applications having options corresponding to different functions. By way of example, computer devices may include desktop computers, notebook computers, servers, terminal workstations, gaming systems, customized hardware, or other equivalent apparatus. Telephony devices may comprise plain-old-telephones, wireless telephones, cellular telephones, satellite telephones, voice over internet protocol telephones, and the like. Mobile devices may include personal digital assistants (PDA), pocket personal computers, smart phones, tablets, handsets, portable gaming systems, and customized hardware, as well as other mobile technologies capable transmitting data. Moreover, content processing device 107 may be used alone or in combination with one or more computing devices 119 to implement various exemplary embodiments.

Content processing devices 107 and/or computing device 119 may be configured to communicate using one or more of networks 103, 111, and 125. These systems can include: a public data network (e.g., the Internet), various intranets, local area networks (LAN), wide area networks (WAN), the public switched telephony network (PSTN), integrated services digital networks (ISDN), other private packet switched networks or telephony networks, as well as any additional equivalent system or combination thereof. These networks may employ various access technologies including cable networks, satellite networks, subscriber television networks, digital subscriber line (DSL) networks, optical fiber networks, hybrid fiber-coax networks, worldwide interoperability for microwave access (WiMAX) networks, wireless fidelity (WiFi) networks, other wireless networks (e.g., 3G wireless broadband networks, mobile television networks, radio networks, etc.), terrestrial broadcasting networks, provider specific networks (e.g., fiber optic networks, cable networks, etc), and the like. Such networks may also utilize any suitable protocol supportive of data communications, e.g., transmission control protocol (TCP), internet protocol (IP), file transfer protocol (FTP), telnet, hypertext transfer protocol (HTTP), hypertext transfer protocol secure (HTTPS), asynchronous transfer mode (ATM), socket connections, Ethernet, frame relay, and the like, to connect content processing devices 107 to various sources of media content, such as one or more third-party content provider systems 105. Although depicted in FIG. 1 as separate networks, data network 103 and/or telephony network 125 may be completely or partially contained within service provider network 111. For example, service provider network 111 may include facilities to provide for transport of packet-based and/or telephony communications.

By way of example, content processing devices 107, as well as computing device 119, may be configured in conjunction with the widget to remotely access one or more servers (not shown), via corresponding communication interfaces (not illustrated), that are configured to execute multiple instances of either media manager 113 or media agent 117. That is, these media applications may be provided in a distributed fashion using, for instance, client-server architectures, such as implemented by enterprise application service providers (ASP). It is noted that ASP models (and other like architectures) offer system scalability in terms of administrative scalability, geographic scalability, and/or load scalability. Thus, distributed environments are attractive modes for disseminating system 100 functionality to a broad spectrum of users and devices.

For example, the aforementioned server may be an "online" system capable of communicating with one or more third-party web servers (not illustrated), content repositories (e.g., repository 115), or equivalent facilities, to provide users various avenues to locate, specify, search, select, receive, and/or share media content that is accessible over one or more data networks 103, such as made accessible via third-party content provider system 105. For example, exemplary embodiments of media applications may comprise hypertext markup language (HTML) user interfaces or JAVA™ applets stored to the server and accessed via world-wide-web pages. These interfaces are particularly useful in extending system 100 functionality to devices having limited resources (e.g., PDAs, handsets, thin-clients, etc.). In alternative embodiments, the server may be collocated with and/or integrated into MSP 121. As such, multiple users, interfaces, and instances of media applications can be simultaneously realized through system 100.

According to other embodiments, media manager 113 and media agent 117 may be configured to communicate over one or more local area networks corresponding to user premises 127a-127n that are facilitated by way of corresponding "home" routers 129. In this manner, routers 129 may be used for establishing and operating, or at least connecting to, a network such as a "home" network or LAN, and is used to route communications within user premises 127a-127n. It is noted that routers 129 may provide for network connectivity not only for one or more computing devices 119, but also for network connectivity for content processing device 107. For example, content processing device 107 may be a set-top box communicatively coupled to router 129 via coaxial cable, whereas computing devices 119 may be connected to router 129 via wireless connection, a network cable (e.g., ethernet cable), and/or the like. It is noted, however, that in certain embodiments content processing device 107 may be configured to establish connectivity with router 129 via one or more wireless connections. Further, content processing device 107 and computing device 119 may be uniquely identified by router 129 via any suitable addressing scheme. For example, router 129 may utilize the dynamic host configuration protocol (DHCP) to dynamically assign "private" DHCP internet protocol (IP) addresses to content processing device 107 and computing devices 119, i.e., IP addresses that are accessible to devices such as devices 107 and 119 that are part of a LAN facilitated via router 129, i.e., connected to router 129.

Accordingly, it is noted that user premises 127a-127n may be geospatially associated with one or more regions. As such, content processing devices 107 associated with these user premises 127a-127n may be configured to communicate with and receive signals and/or data streams from MSP 121 (or other transmission facility, e.g., third-party content provider system 105) in response to processes of one or more of media manager 113 and media agent 117. These signals may include media content retrieved over a data network (e.g., service provider network 111, data network 103, and/or telephony network 125), as well as conventional video broadcast content.

MSP 121 can include one or more media content servers (not illustrated) and/or data repositories (not shown). Alternatively, user profile repository 131, content repository 115, or the aforementioned server may be accessed via one or more of service provider network 111 and/or data networks 103. Further, service provider network 111 may include a system administrator (not shown) for operational and management functions to deploy the virtual channel services using, for instance, an internet protocol television (IPTV) system. In this manner, content processing devices 107 may utilize any suitable technology to draw, receive, and/or transmit media content from/to MSP 121 or any other suitable content source/sink, such as third-party content provider system 105.

In an exemplary embodiment, content processing devices 107 may draw, receive, and/or transmit content from (or to) multiple sources, thereby alleviating the burden on any single source, e.g., MSP 121, to gather, supply, or otherwise meet the content demands of any user or premise. Thus, particular embodiments enable authenticated third-party television broadcast systems 123, third-party content provider systems 105, and servers (not shown) to transmit media content accessible over a data network 103 to content processing devices 107 either apart from, or in conjunction with, MSP 121. Such media content may include media regarding traffic, news, drama, sports, current events, breaking stories, commentary, headlines, advertisements, solicitations, financial advice, stocks, markets, events, schools, governments, blog entries, podcasts, and the like. Moreover, media content may be available from authenticated sources, including grassroots groups or individuals, non-profits, governmental organizations, public/private institutions, etc.

The media content may be distinguished (or otherwise categorized) utilizing metadata included therewith or appended thereto. Metadata can be generally considered data about data; but more specifically, it can be utilized to describe all aspects of, and media content distributed by, system 100. Namely, metadata can include descriptions about: data aspects (file name, type, administrator, size, location, version, or include timestamps, mode bits, arbitrary attribute-value pairs, etc.), titles, activities/events, individuals and organizations involved, intended audiences (e.g., ethnicities, ages, genders, incomes, educational levels, disabilities, mobilities, as well as other like demographic statistics), geospatial identifications (intended zip codes, school districts, communities, etc.), locations of supplementary information and processes, access methods, limitations, timing of activities/events (e.g., start/end dates), as well as motivations, policies and rules. As such, metadata may be utilized by various components of system 100 for control or guiding purposes. According to certain embodiments, content aggregation platform 101 may be configured to aggregate and maintain one or more repositories, e.g., metadata repository 133, of this metadata for users to search and receive media content from one or more third-party content provider systems 105, or any other suitable source.

In particular embodiments, system 100 may structure and encode metadata to describe characteristics of the content-bearing entities to aid in the identification, discovery, assessment, and furthermore, rendering of items to a virtual environment for enabling user interaction with the item in connection with media manager 113 and/or media agent 117. For example, the metadata can be used to optimize compression algorithms or perform other computational tasks by the components of system 100. The metadata might be utilized to share media content among a plurality of content processing devices 107. Various other embodiments might use metadata to provide search results, suggest media content sources of interest to a user based on information stored in a user profile, and the like.

In various embodiments, service provider network 111 may include one or more video and/or audio processing modules (not shown) for acquiring and transmitting content feeds (including media content accessible over a data network) from MSP 121, the television broadcast systems 123, the third-party content provider systems 105, or servers (not shown) over one or more of the networks 103, 111, and 125, to particular content processing devices 107. As such, service provider network 111 may include facilities to support compression/decompression, coding/decoding, modulation/demodulation, optical/electrical conversion, and analog/digital conversion, as well as any other suitable signal processing and/or transmission operation. Further, service provider network 111 may optionally support end-to-end data encryption in conjunction with media content streaming services such that only authorized users are able to experience content and interact with other legitimate users/sources.

Accordingly, system 100 may include an authentication module (not shown) configured to perform authorization/authentication services and determine whether users or content sources are indeed subscribers to, or providers of, the virtual channel service. An authentication schema may require a user name and password, a key access number, a unique machine identifier (e.g., media access control (MAC) address), etc., as well as a combination thereof. Once a subscriber has authenticated a presence on system 100, the user may bypass additional authentication procedures for executing later applications (e.g., media content streaming instances). Data packets, such as cookies, may be utilized for this purpose; however, other authentication information may be utilized, such as described below. Thus, once a content processing device 107 and/or source is authenticated, connections between content processing devices 107 and the content sources may be established directly or through MSP 121 and/or computing device 119.

In other embodiments, authentication procedures on a first device (e.g., content processing device 107) may identify and authenticate a second device (e.g., computing device 119) communicatively coupled to, or associated with, the first device. Further, the authentication module may grant users the right to receive media content from multiple system 100 sources by revoking existing sets of digital certificates associated with a particular provider, and issuing new sets of digital certificates mapped to a second provider. In this regard, a content processing device 107 may receive new media content from a second source, whereas the previous session may be automatically closed when the "old" or prior certificates associated with the first source are revoked. This enables users to initiate secure sessions at any given content processing device 107 (or computing device 119) linked to system 100, whether or not the content processing device (or computing device) belongs to that individual user. It is additionally contemplated that multiple rights sessions may exist concurrently.

In particular embodiments, MSP 121 may comprise an IPTV system configured to support the transmission of television video programs from the broadcast systems 123 as well as other content, such as media content from the various third-party sources (e.g., 105, 115, and 123) utilizing internet protocol (IP). That is, the IPTV system 121 may deliver signals and/or streams, including media content accessible over a data network, in the form of IP packets. Further, the transmission network (e.g., service provider network 111) may optionally support end-to-end data encryption in conjunction with the streaming services, as previously mentioned.

In this manner, the use of IP permits television services to be integrated with broadband Internet services, and thus, share common connections to a user site. Also, IP packets can be more readily manipulated, and therefore, provide users with greater flexibility in terms of control and offers superior methods for increasing the availability of media content (including content accessible over data networks). Delivery of video content, by way of example, may be through a unicast or multicast from the IPTV system 121 (or third-party content provider system 105, computing device 119, etc.) to the content processing devices 107. Any individual content processing device 107 may tune to a particular source, e.g., virtual channel, by simply joining a multicast (or unicast) of the media content, utilizing an IP group membership protocol (IGMP). For instance, the IGMP v2 protocol may be employed for joining content processing devices to new multicast (or unicast) groups. Such a manner of content delivery avoids the need for expensive tuners to view media content, such as television broadcasts; however, other delivery methods, such as directly modulated carriers (e.g., national television systems committee (NTSC), advanced television systems committee (ATSC), quadrature amplitude modulation (QAM)), may still be utilized. It is noted that conventional delivery methods may also be implemented and combined with the advanced methods of system 100. Further, the media content, in the form of virtual channels, may be provided to various IP-enabled devices, such as those computing, telephony, and mobile apparatuses previously delineated.

As such, exemplary content processing devices 107 (e.g., STBs) may integrate all the functions of an IPTV system, as well as combine the media content functions of the various online or off-line environments, in a manner that seamlessly toggles among the various system 100 resources. It is contemplated that the virtual channel service may be extended to users with a presence on the Internet. In alternative embodiments, the services of system 100 could be extended to users having an end terminal (not shown), such as a plain old telephone service (POTS) device, connected to the telephony network 125. While system 100 is illustrated in FIG. 1, the exemplary components are not intended to be limiting, and indeed, additional or alternative components and/or implementations may be utilized.

Figure 2:
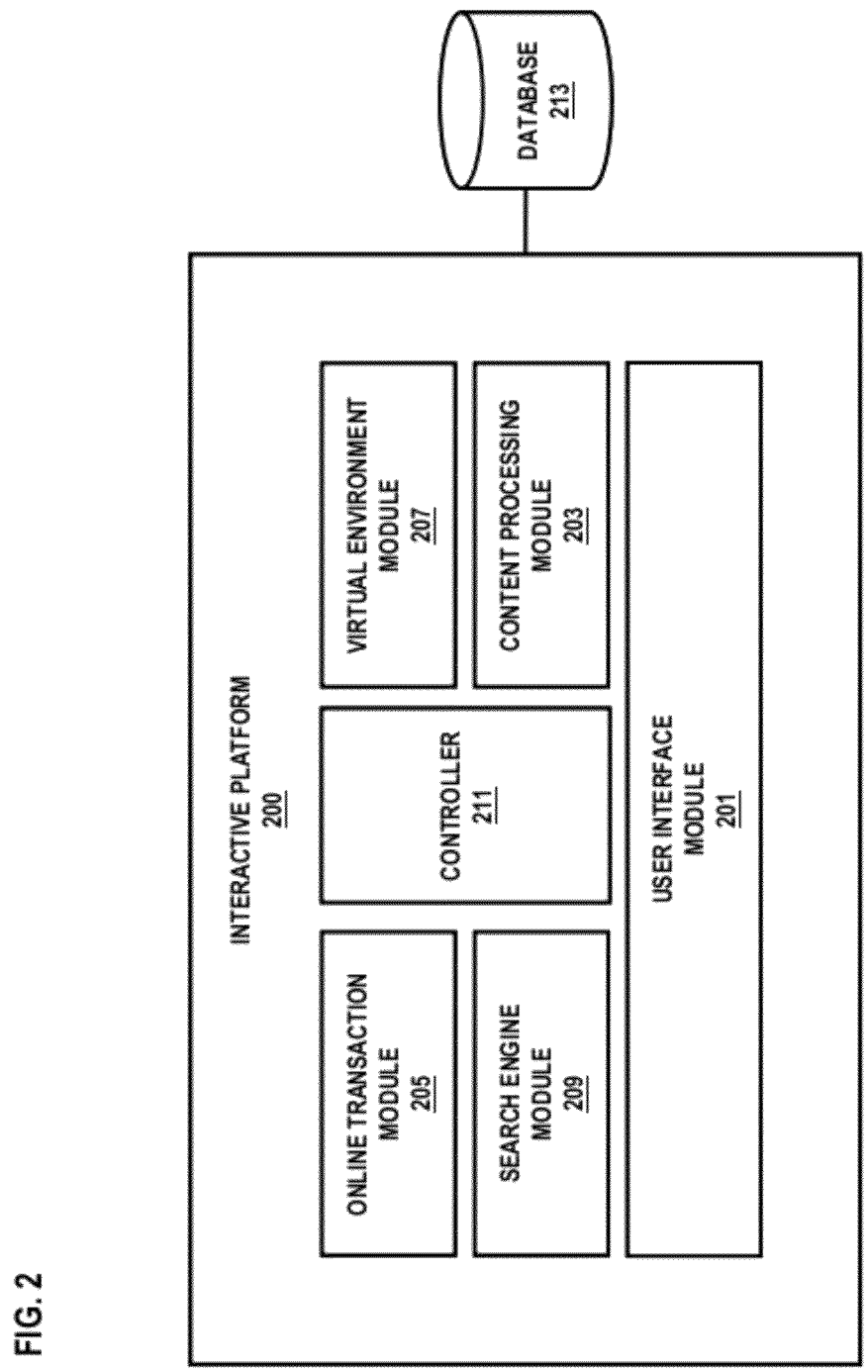
FIG. 2 is a diagram of an interactive platform utilized in the system of FIG. 1, according to an exemplary embodiment.

FIG. 2 is a diagram of an interactive platform utilized in the system of FIG. 1, according to an exemplary embodiment. Interactive platform (or platform) 200 may comprise computing hardware, as well as include one or more components configured to execute the processes described herein for facilitating direct user interaction with specific items of content as presented by a content delivery system. In one implementation, platform 200 includes user interface module 201, content processing module 203, search engine module 209, virtual environment module 207 and online transaction module 205. It is noted that platform 200 may communicate with one or more media applications, such as media manager 113 and/or media agent 117. Platform 200 may also communicate with one or more third party content provider systems 105 and/or one or more user devices, such as computing device 119 and content processing device 107. In particular, this arrangement is suitable for enabling access to the interactive platform 101 in connection with a content delivery system, e.g., a STB. While specific reference will be made to this particular implementation, it is also contemplated that platform 200 may embody many forms and include multiple and/or alternative components. For example, it is contemplated that the components of platform 200 may be combined, located in separate structures and/or separate locations.

In certain embodiments, content processing module 203 may be configured to maintain one or more networked repositories, e.g., repository 133, of aggregated metadata relating to media content available via a plurality of third-party content provider systems 105. For instance, the metadata may relate to thumbnails, uniform resource locators, titles, addressing information, descriptions, sources, ratings, tags, durations, media types, publishing dates, number of views, height, width, size, author, etc. Still further, the content processing module 203 may access metadata of various types pertaining to specific items of content for enabling processing of specific items, including but not limited to data indicating a media content or item identifier value, a point in time of presentation of the item as media content, a mode of orientation of the item corresponding to a point in time of presentation of media content, a purchase order or transaction record, a scene identifier, a sequence identifier, etc. Hence, in accordance with certain embodiments, the content processing module 203 may be configured to process—i.e., identify, delineate, mark, distinguish—specific items of content based at least in part on the metadata. By contextually recognizing specific items, the items are thus made available for interaction with (e.g., within a virtual environment) by the content processing module 203 upon demand by a user.

Consider, for example, a specific scene of a movie that is presented to the STB 107 as media content. In a particular mode of operation, in accordance with certain embodiments, the content processing module 203 receives or retrieves metadata pertaining to certain, if not all of the items comprising the scene in advance of, or during presentation of the content to the STB 107. The decision to access metadata in advance of, or during depends on known processing speeds for the STB 107, data network 103 access conditions or other factors. When processing speeds and/or network conditions are determinably slower, the content processing module may be configured to access metadata in advance of presentation of content.

In another mode of operation, in accordance with certain embodiments, the content processing module 203 executes one or more instructions for identifying, delineating, marking and/or distinguishing items of content based at least in part on the metadata as retrieved or received. As such, specific items may be "recognized/identified" by the content processing module 203 as an item eligible for user interaction. Hence, the content processing module 203 automatically itemizes particular items presented within the movie scene (e.g., objects, people, advertisements) based at least in part on the metadata. Media manager 113 and/or media agent 117 may be configured, in connection with the content processing module 203, to specify media content or particular items thereof for representation within a virtual environment via computing device 119 and/or content processing device 107 for presentation.

According to certain embodiments, platform 200 may not be permitted to (or may simply not) maintain metadata associated with the media content made available via one or more third-party content provider systems 105. As such, search engine module 209 is configured to receive query information and authentication information of a user from a media application (e.g., media manager 113 and/or media agent 117) associated with, for instance, content processing device 107, such as set-top box, and generate a query request for specific items of media content from one or more third-party content provider systems 105 using the query information, the authentication information, and an identifier of a service provider of system 100. In this manner, search engine module 209 may be configured, in conjunction with user interface 201, to initiate transmission of the query request to the one or more third-party content provider systems 105 and, thereby, receive one or more search results in response to the query request.

In the context of a potential purchase transaction, for example, the query can be directed towards providing details (e.g., purchase price, vendor details, manufacturer details, product information, etc.) regarding a specific item of media content. In the context of a research transaction, for example, the query can be directed towards acquiring historic, present day, popular news, social data or other related information about a specific item of media content. In the context of a game transaction, for example, the query can be directed towards acquiring clues, hints or suggestions regarding a specific item of media content. Indeed, various types of query may be appropriately performed by the search engine module 209 relative to a specific item of media content. In some instances, where query results cannot be satisfactorily fulfilled because of various reasons (e.g., absence of data relative to a given item in a database), the database may be updated with a record of the item or associated information accordingly—i.e., as part of a historical log of items of interest for a particular user. It is noted that search engine module 209 via, for example, user interface module 201 may also be configured to initiate transmission of the one or more search results to the media application for presentation via content processing device 107 and/or computing device 119.

According to certain embodiments, platform 200 may further include one or more controllers (or processors) 211 for effectuating the aforementioned features and functions of platform 200, as well as one or more repositories 213 for permanent and/or temporary storage of one or more of the aforementioned variables, parameters, information, signals, messages, identifiers, addresses, locators, etc. In this manner, the features and functions of platform 200 may be executed by platform 200, such as in response to controller(s) 211 (or other components of platform 200) executing computer program code (or other instructions) stored to a datastore 213.

According to certain embodiments, platform 200 may further include a virtual environment module 207. The virtual environment module 207 performs various instructions for generating a virtual environment that includes at least an image (or virtual) representation of a specific media item—i.e., such as specified by way of a content processing module 203. In addition, the virtual environment module 207 performs one of more instruction for rending presentation of a specific media item based, at least in part, on an input from a user via the set-top box in connection with the widget. Still further, the virtual environment module 207 operates in connection with the various other modules for generating an interactive environment suitable for enabling user interaction with an image, video, 3D model or other representation of specific media content items of interest. For example, the virtual environment module 207 may operate in connection with the user interface module 201 to render to a graphical user interface (e.g., display of the STB) providing a split-screen including the media content and an image or other representation of a selected item of media content. In relation to the item of interest, other objects may be rendered in association with a given item of media content. As another example, the virtual environment module 207 may operate in connection with the search engine module 209 and user interface module 201 to enable presentation of query results within the generated virtual environment associated with a specific item of interest. It is noted that the virtual environment module 207 is operable in connection with the interactive platform 200 so as to enable a widget to be presented concurrent with media content via the set-top box or other content delivery system.

According to certain embodiments, platform 200 may further include an online transaction module 205 for operation in connection with the virtual environment module 207 to facilitate purchase of specific media content items of interest. Specifically, the online transaction module 205 transmits a request initiated by a user of a set-top box operable concurrent with a widget to execute a transaction for the purchase of the selected item. Purchase processing related functions executable by the online transaction module 205, may include, but is not limited to, enabling placement of select items into a shopping cart, maintaining a wish list of items to purchase or investigate, segregating items or transactions into one or more shopping carts, enabling payment processing, facilitating shipment of items, enabling recall of items selected for purchase, etc. It is noted that any means of facilitating purchase processing of items of interest may be executed by the online transaction module 205, notwithstanding, operation of the module 205 in connection with the various other modules.

Thus, under the arrangements of FIGS. 1-2, a user may receive and view media content as well as interact with select items of media concurrent with the transmission of media content over one or more data networks 103. An environment for facilitating interaction by way of a STB concurrent with a widget, is enabled relative to any media content, to facilitate various user related transactions in connection with a content delivery system—i.e., purchase transaction, research transaction, entertainment transaction.

Figure 3:
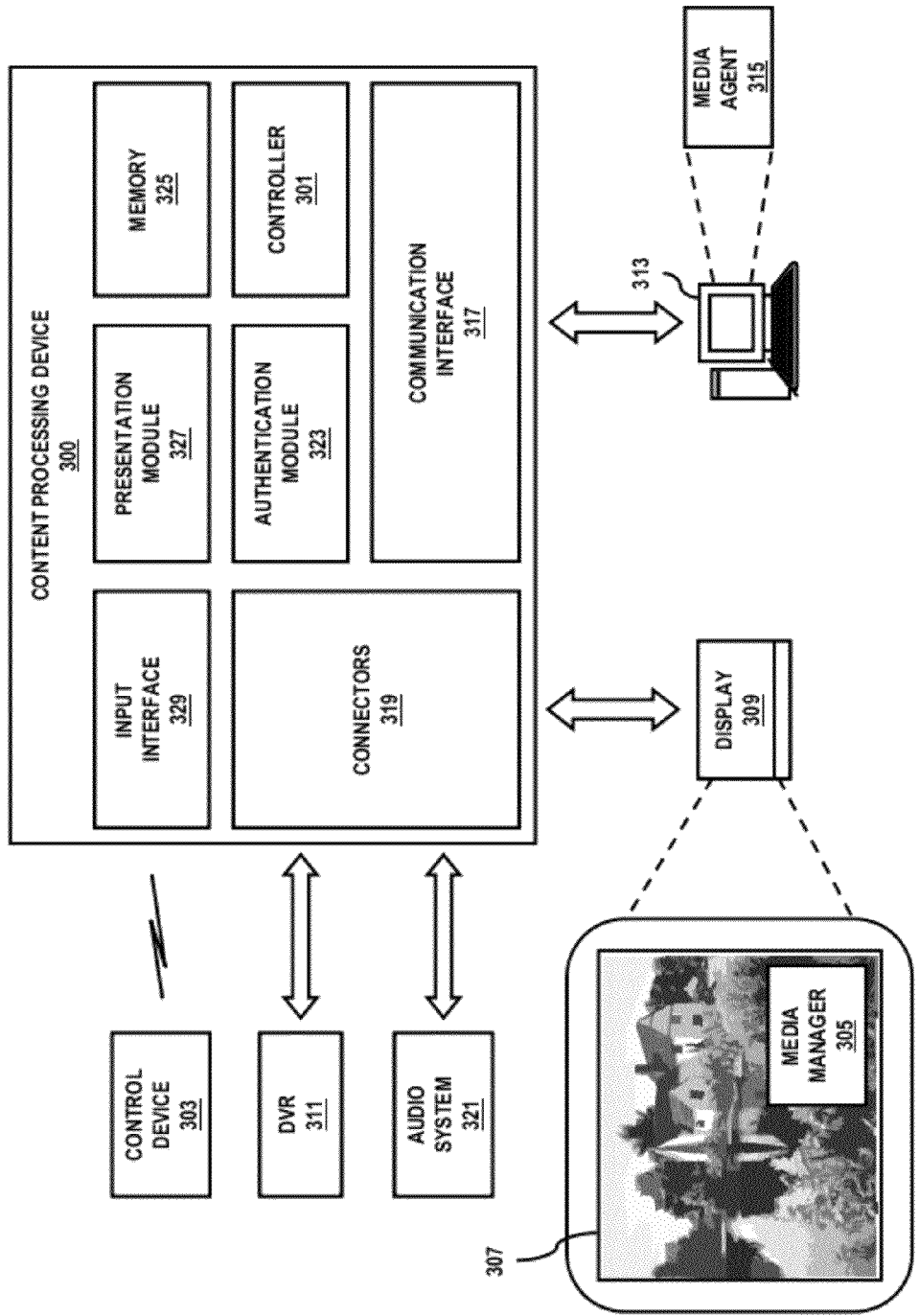
FIG. 3 is a diagram of a content processing device configured to facilitate content aggregation in support of virtual channels, according to an exemplary embodiment.

FIG. 3 is a diagram of a content processing device configured to facilitate content aggregation in support of virtual channels, according to an exemplary embodiment. Content processing device (or device) 300 may comprise any suitable technology to receive one or more content streams from a media source, such as MSP 121 and one or more third-party content provider systems 105. The content streams include media content retrieved over one or more data networks 103, in response to commands from one or more media applications, such as media manager 113 and/or media agent 117. As mentioned, objects or items within the content can then be presented to a user for consumption—e.g., purchase.

Accordingly device 300 may comprise computing hardware (such as described with respect to FIGS. 7 and 8) and include additional components configured to provide specialized services related to the reception and display of media content, such as one or more remote control capabilities, conditional access functions, tuning functions, presentation functions, multiple network interfaces, audio/video signal ports, and the like. Alternatively (or additionally), the functions and operations of device 300 may be governed by one or more controllers 301 that interacts with the components of device 300 to provide media content retrieved from, for example, third-party media content provider system 105 or any other suitable component or facility of system 100. In turn, a user may be afforded greater functionality utilizing a control device 303 to control these services, functions, interfaces, etc., as will be more apparent below.

As such, device 300 may be configured to process a content stream, including causing media application (e.g., media manager 305) and/or one or more components of the media content (e.g., video component 307 and/or an audio component) to be presented on (or at) display 309. Presentation of the media content may include: displaying, recording, playing, rewinding, forwarding, toggling, selecting, zooming, or any other processing technique that enables users to experience one or more content streams. For instance, device 300 may provide one or more signals to display 309 (e.g., a television set) so that display 309 may present (e.g., display) media manager 305 overlaid on the media content (e.g., video 307) to a user, wherein the media content includes content retrieved over one or more data networks 103, such as from third-party content provider system 105. Moreover, display 309 can present the GUI of FIGS. 6A and 6B to permit a user to select items corresponding to the media content for consumption.

Device 300 may also interact with a PVR, such as digital video recorder (DVR) 311, to store received signals that can then be manipulated by a user at a later point in time. In various embodiments, DVR 311 may be network-based, e.g., included as a part of service provider network 111, collocated at a subscriber site (e.g., user premise 127a) having connectivity to device 300, and/or integrated into device 300. Display 309 may present media content provided via device 300 to a user. In alternative embodiments, device 300 may be configured to communicate with a number of additional peripheral devices, including: computing device 313, laptops, PDAs, cellular phones, monitors, mobile devices, handheld devices, as well as any other equivalent technology capable of presenting media content to a user, such as those computing, telephony, and mobile user devices described with respect to FIG. 1.

These peripherals may be configured to implement instances of media manager 305 to access media content stored and/or processed by device 300. For example, a media content stream may be received by device 300 and recorded by DVR 311, wherein computing device 313 may later access and view the stored content. Moreover, the peripheral devices may be configured to program or otherwise control various functions of device 300. For instance, a media application (e.g., media agent 315) executed via computing device 313 may receive input from a user specifying media content that is accessible via third-party content provider system 105. As such, a communication interface (not illustrated) of computing device 313 may be configured to retrieve the media content over one or more data networks 103, transcode the media content (in certain instances) and, thereby, stream the media content to device 300 for presentation. As such, device 300 may receive a media content stream from computing device 313 to present to a user via display 309.

In another embodiment, user input to device 300 and/or a peripheral device (e.g., computing device 313) executing an instance of a media manager application may cause one or more search results to be received and, thereby, made available to device 300 or another content processing device, computing device, telephony device, or mobile device capable of processing audio and/or video streams associated with the search results. Still further, user input to a media application, such as media manager 305 and/or media agent 315, may be configured to program or otherwise control the functions of device 300. For instance, a user may access media agent 315 via computing device 313 and, thereby, search for, locate, select, and/or specify media content to be retrieved over one or more data networks 103 and, thereby, streamed to device 300, or any other suitable user device. In this manner, third-party content provider system 105 (and other components/facilities of system 100, such as MSP 121) may, when suitable, transmit (e.g., stream) specified media content to device 300 for presentation via display 309.

Furthermore, device 300 may include communication interface 317, which may be configured to receive content streams from an MSP 121, computing device 313, and/or other media content sources, such as third party content provider system 105. Communication interface 317 may optionally include single or multiple port interfaces. For example, device 300 may establish a broadband connection to multiple sources transmitting content to device 300 via a single port, whereas in alternative embodiments, multiple ports may be assigned to the one or more sources. In still other embodiments, communication interface 317 may be configured to permit users, via device 300, to transmit data (including media content) to third-party content provider systems 105, to other users with content processing devices, MSP 121, and/or any other suitable media content source/sink.

According to various embodiments, device 300 may also include inputs/outputs (e.g., connectors 319) to display 309 and DVR 311, as well as to audio system 321. In particular, audio system 321 may comprise a conventional audio-video receiver capable of monaural or stereo sound, as well as multichannel surround sound. Audio system 321 may include speakers, ear buds, headphones, or any other suitable component configured for personal or public dissemination. As such, device 300, display 309, DVR 311, and audio system 321, for example, may support high resolution audio and/or video streams, such as high definition television (HDTV) or digital theater systems high definition (DTS-HD) audio. Thus, device 300 may be configured to encapsulate data into a proper format with required credentials before transmitting onto one or more of the networks of FIG. 1 and de-encapsulate incoming traffic to dispatch data to display 309 and/or audio system 321.

In an exemplary embodiment, display 309 and/or audio system 321 may be configured with internet protocol (IP) capability (i.e., includes an IP stack, or is otherwise network addressable), such that the functions of device 300 may be assumed by display 309 and/or audio system 321. In this manner, an IP ready, HDTV display or DTS-HD audio system may be directly connected to one or more service provider networks 111, data networks 103, and/or telephony networks 125. Although device 300, display 309, DVR 311, and audio system 321 are shown separately, it is contemplated that these components may be integrated into a single component, or other combination of components.

An authentication module 323 may be provided by device 300 to initiate or respond to authentication schemes of, for instance, service provider network 111, third-party content provider systems 105, or various other content providers, e.g., broadcast television systems 123, etc. Authentication module 323 may provide sufficient authentication information, e.g., a user name and password, a key access number, a unique machine identifier (e.g., MAC address), and the like, as well as combinations thereof, to a corresponding network interface for establishing connectivity, such as router 129. As described earlier, one or more digital certificates may be simultaneously mapped. Moreover, authentication at device 300 may identify and authenticate a second device (e.g., computing device 313) communicatively coupled to, or associated with, device 300, or vice versa. Further, authentication information may be stored locally at memory 325, in a repository (not shown) connected to device 300, or at a remote repository, e.g., user profile repository 131.

Authentication module 323 may also facilitate the reception of data from single or disparate sources. For instance, device 300 may receive broadcast video from a first source (e.g., MSP 121), signals from a media application at second source (e.g., computing device 313), and a media content stream from a third source accessible over data networks 103 (e.g., third-party content provider system 105). As such, display 309 may present the broadcast video, media application, and media content stream to the user, wherein device 300 (in conjunction with one or more media applications) can permit users to experience various sources of media content traditionally limited to the data domains. This presentation may be experienced separately, concurrently, in a toggled fashion, or with zooming, maximizing, minimizing, or trick capabilities, or equivalent mode. In other exemplary embodiments, authentication module 323 can authenticate a user to allow them to interact with one or more third-party subscriber account features associated with third-party content provider systems 105.

Presentation module 327 may be configured to receive media content streams (e.g., audio/video feed(s) including media content retrieved over a data network) and output a result via one or more connectors 319 to display 309 and/or audio system 321. In this manner, presentation module 327 may also provide a user interface for a media application via display 309. Aural aspects of media applications may be presented via audio system 321 and/or display 309. In certain embodiments, media applications, such as media manager 305, may be overlaid on the video content output 307 of display 309 via presentation module 327.

In any case, however, the media content streams may include content received in response to user input specifying media content that is accessible by way of one or more third party content provider systems 105 and, thereby, available over at least one data network 103, wherein the media content may be retrieved by media agent 315 and streamed to device 300 for presentation via display 309 and/or audio system 321. Accordingly, presentation module 327 may be configured to provide lists of search results and/or identifiers to users for selection of media content to be experienced. Exemplary search results and/or identifiers may include graphical elements, channels, aural notices, or any other signifier, such as a uniform resource locator (URL), phone number, serial number, registration number, MAC address, code, etc.

Connector(s) 319 may provide various physical interfaces to display 309, audio system 321, as well as other peripherals; the physical interfaces may include, for example, RJ45, RJ11, high definition multimedia interface (HDMI), optical, coax, FireWire, wireless, and universal serial bus (USB), or any other suitable connector. The presentation module 327 may also interact with control device 303 for determining particular media content that a user desires to experience. In an exemplary embodiment, control device 303 may comprise a remote control (or other access device having control capability, such as computing device 313, a wireless user device, mobile phone, etc.) that provides users with the ability to readily manipulate and dynamically modify parameters affecting the media content being viewed. In other examples, device 300 may be configured for voice recognition such that device 300 may be controlled with spoken utterances.

In this manner, control device 303 may include (not shown) a cursor controller, trackball, touch screen, touch pad, keyboard, and/or a key pad for activating a media application, navigating through broadcast channels, search results, and/or media content identifiers, as well as performing other control functions. For instance, control device 303 may be utilized to maximize a media application, navigate through displayable interfaces, locate/specify/retrieve media content, modify device 300 parameters, or toggle through broadcast channels and/or media content identifiers. Control device 303 may also include functional actuators (e.g., buttons, keys, icons, etc.), such as power on/of, play, pause, stop, fast-forward, reverse, volume up/down, channel up/down, menu, ok/enter, record, info, my content, search, edit, or exit, as well as any other suitable control trigger, such as alphanumeric buttons, shift, control, back, symbols, and the like.

Further, control device 300 may comprise a memory (not illustrated) for storing preferences affecting media content viewed, which can be conveyed to device 300 through an input interface 329. Input interface 329 may support any type of wired and/or wireless link, e.g., infrared, radio frequency (RF), BLUETOOTH, and the like. Thus, control device 303 may store user preferences with respect to media content, such as favorite sources, etc. Alternatively, user preferences may be tracked, recorded, or stored at device 300 or at a network user profile repository 131. The preferences may be automatically retrieved and activated by a user at any time. It is noted that control device 303 may be separate from device 300 or may be integrated within device 300, in which case certain input interface hardware and/or software may be superfluous.

Particular embodiments enable users, via control device 303, to populate or otherwise configure a user profile. For instance, a user profile application may be provided or accessed by device 300 to enable users to populate a plurality of entry fields with user information. A user profile may include one or more customized or personalized settings that affect any aspect of media content accessible via device 300. More specifically, the profile may include: subscription information (account number, user name, password, avatar, moniker, etc.), subscriber demographics (age, gender, ethnicity, location of residence, zip code, school district, community, socioeconomic status, religion, marital status, ownerships, languages, mobility, life cycles, etc.), group/organizational affiliations (e.g., political), memberships, interests, buddies, friends, cohorts, system configurations, policies, associated users/devices, etc., as well as any other like personal information. Additionally, a user profile may include a "whitelist" specifying one or more accessible media content sources/ subjects, a "blacklist" specifying one or more media content sources/subjects, as well as other equivalent customized settings, such as color schemes, sound effects, etc.

In other embodiments, the user profile may be established using the additional access devices described earlier, e.g., computing device 313, etc. As such, user profile information may be stored at device 300, e.g., at memory 325, and/or at a user site repository (not illustrated) directly connected to device 300. Additionally or alternatively, profile information may be stored in a network-based repository (e.g., remote user profile repository 131), control device 303, and/or any other storage medium. Similarly, device 300 (via memory 325), a user site repository, and/or a network-based repository may store a "MY CONTENT" collection of digital audio, video and/or image content accumulated by a user. This collection may also include a plurality of identifiers, links, search results, or bookmarks to media content accessible over one or more data networks 103, wherein selection of a particular identifier, link, search result, or bookmark may cause one or more media applications to obtain the content from an associated link (either directly from a data network source (e.g., content repository 115) or indirectly from third-party content provider system 105 and/or MSP 121).

Thus, under the above arrangements of FIGS. 1-3, a user may experience (e.g., search for, locate, specify, and receive) content, as well as consume items presented within media content.

Figure 4A:
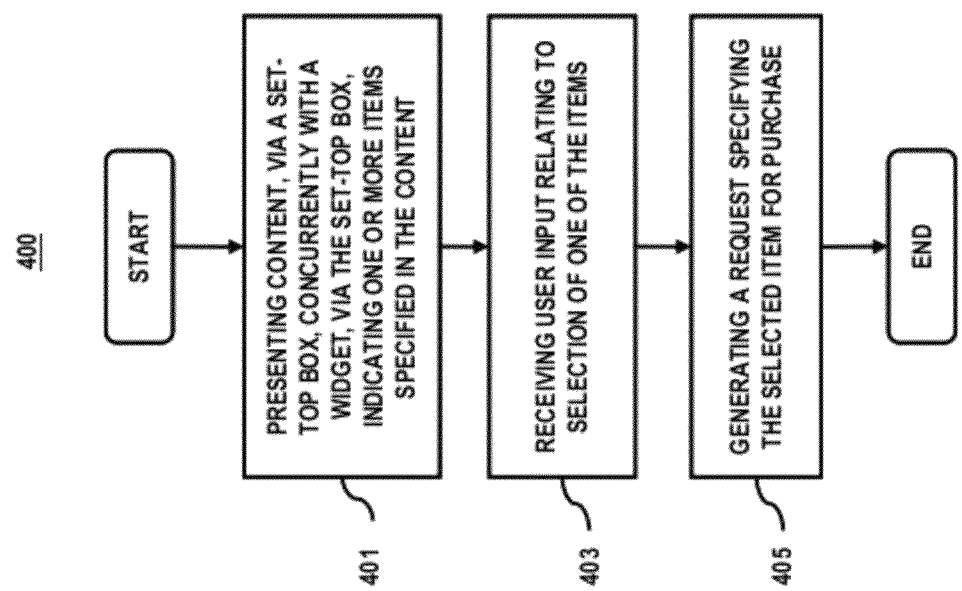
FIGS. 4A and 4B are flowcharts depicting processes for providing direct user interaction with specific items of content, according to an exemplary embodiment.
Figure 4B:
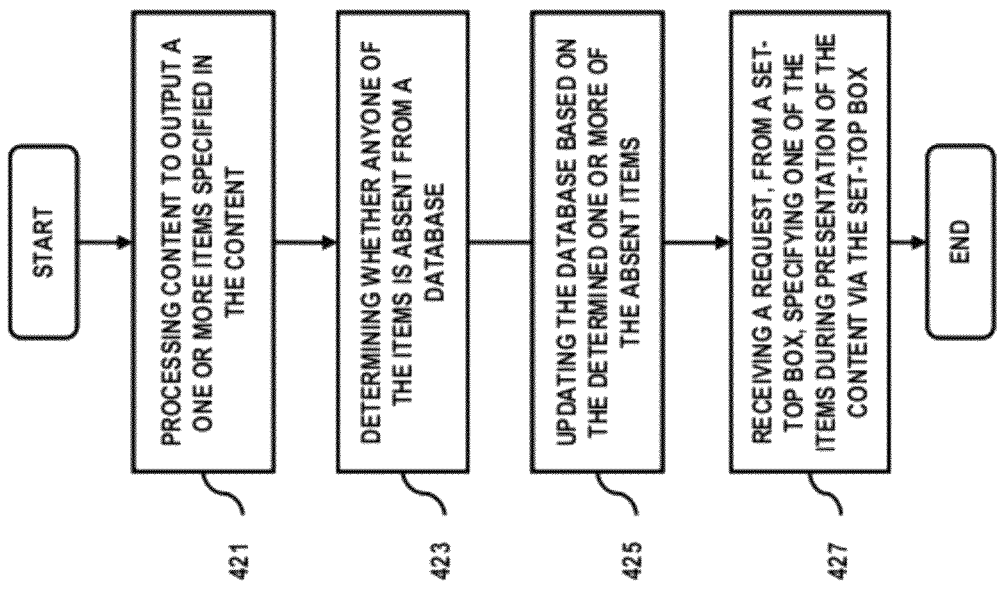

FIGS. 4A and 4B are flowcharts depicting processes for providing direct user interaction with specific items of content, according to an exemplary embodiment. With reference now to FIG. 4A, a flowchart depicting the process for enabling direct user interaction with specific items of content as presented by a content delivery system, i.e., a set-top box, according to an exemplary embodiment. As a first step 401 in the process 400, a set-top box presents content concurrently with a widget indicating one or more items specified in the content. Resultantly, the widget is presented via the set-top box in tandem with the content, enabling the user to interact with the interactive platform associated with the content delivery system for the purpose of engaging specific items of media content. Hence, as a result and pursuant to next step 403, the interactive platform receives via the widget, user input relating to selection of one of the items. As yet another step 405, a request specifying the selected one of the items for purchase is generated by the interactive platform via the widget. Ultimately, therefore, the user is able to facilitate the purchase process on demand by way of a direct media presentation experience.

FIG. 4B presents the exemplary process by which the interactive platform 200 is "trained" to enable user interaction with specific items of content as presented by a content delivery system, according to one embodiment. By way of example, "training" can involve automatically recognizing specific items presented as media content to a STB, i.e., during a television broadcast, which was not previously recognizable. It is noted, for example, that some items of content may not be "recognizable" by the content processing module 203 of interactive platform 200 due to a minimal or no available metadata having been formulated, retrieved or associated with that specific item. When this is the case, the extent of interaction or engagement by the user with certain items of content is limited. For instance, a particular pair of boots worn by an actress within a scene of a television broadcast could not be engaged and/or ultimately rendered for interaction by the user to the virtual environment if the boots are not themselves or have no metadata featured in the database. Hence, process 420 of FIG. 4B pertains to the means in which specific items presentable as content may be made available for interaction by the user in the virtual environment. Through enablement of this process, any item can be appropriately perceived as content and thus activated by a user of a content delivery system.

As in step 421, the interactive platform 200 (e.g., content processing module 203) processes media content in order to output a plurality of items specified in the content. This processing may include itemizing the media content to determine the various items comprising the content. In step 423, the interactive platform 200 performs a check of its repository/ database 213 to determine whether anyone of the items is represented therein (or absent from the database 213). This determining step may be performed by the controller 211 operating in connection with the content processing module 203 of the interactive platform 200. Next, per step 425, the database is updated based on the determined one or more of absent items from the database. The updating process may include performing an online search by the search engine module 209 to ascertain details regarding the item—i.e., based on minimally known metadata or facts about the item. Metadata or facts known about another recognizable item within the content may also be associated with the item in certain instances, or user specified input regarding the item as received via the user interface module 201 or virtual environment module 207 of the platform 200 may be accepted and stored to the database. Once updated, a further step 427 of receiving a request from the user of the STB specifying one of the items during presentation of content can be processed by the interactive platform 200. It is noted that the presentation of content, as referenced in this embodiment, may refer to that as broadcast or as presented within the virtual environment, in either case via the STB.

Figure 5:
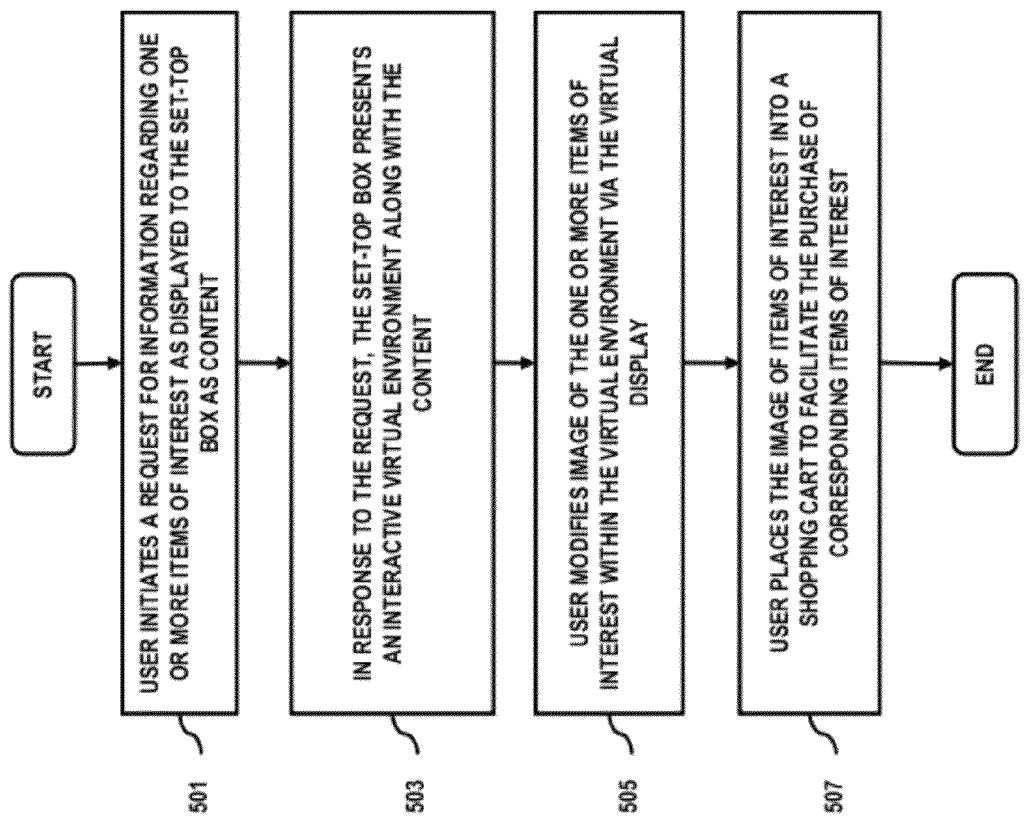
FIG. 5 is a flowchart depicting a process for availing the user of items within media content using a virtual environment, according to an exemplary embodiment.

FIG. 5 is a flowchart depicting a process for availing the user of items within media content using a virtual environment, according to an exemplary embodiment. For the purposes of explanation, this process is described with respect to the user interface of FIGS. 6A and 6B, as utilized by the STB 300 of FIG. 3. In seen in FIG. 6A, a user is watching a television, media or multimedia broadcast 600a via the screen/interface 600 of a content delivery system, i.e., a set-top box (STB). The particular scene represented as media content—i.e., image or broadcast—rendered to the screen 600 features an actress 601 standing behind a couch 603, a glass table top 605 having thereon an ornate pencil holder 607, coffee mugs 609, a vase 611, an end table featuring a lamp 613, a fireplace mantle featuring flowerpots 615 and 617 and decorative artwork 619. Also appearing on the display/ screen is a widget 621, which itself features various action buttons 623-629 for allowing the user to interact with various items of media content as presented to the screen 600. It is assumed in this scenario that all of the items are recognizable by the content processing module 203 of the interactive platform 200. In those instances, however, where a particular item is not recognizable, such as in the case where the user desires detail regarding the throw pillow 631, the process presented with respect to FIG. 4B is performed.

As the user views the media content, a popup window or other indicator may be displayed (not shown in figure) to the screen prompting the user to activate the information button 623 if the user is interested in any merchandise shown on the screen (e.g., items 603-619). In the context of a non-purchase transaction, the user could also be prompted to activate the information button 623 to get details about the movie being broadcast or access details about the specific actress 601 being rendered to the display 600. In the former case, the user initiates a request for information regarding one or more items (e.g., merchandise) of interest, corresponding to step 501 of FIG. 5. By activating the information button 623, such as via remote control manipulation of a media manager 113 associated with the STB 300, the user is prompted with an itemized list featuring the various items 603-619 that are included in the media content as presented. This corresponds to a list of items available for interaction within a virtual environment facilitated by the widget 621/interactive platform 101. From the list, the user may choose a specific item to further engage or interact with. In this example, the user selects the coffee mug 609.

Figure 6A:
FIGS. 6A and 6B are diagrams of a user interface utilized in the process of FIGS. 3-5, according to an exemplary embodiment.
Figure 6B:
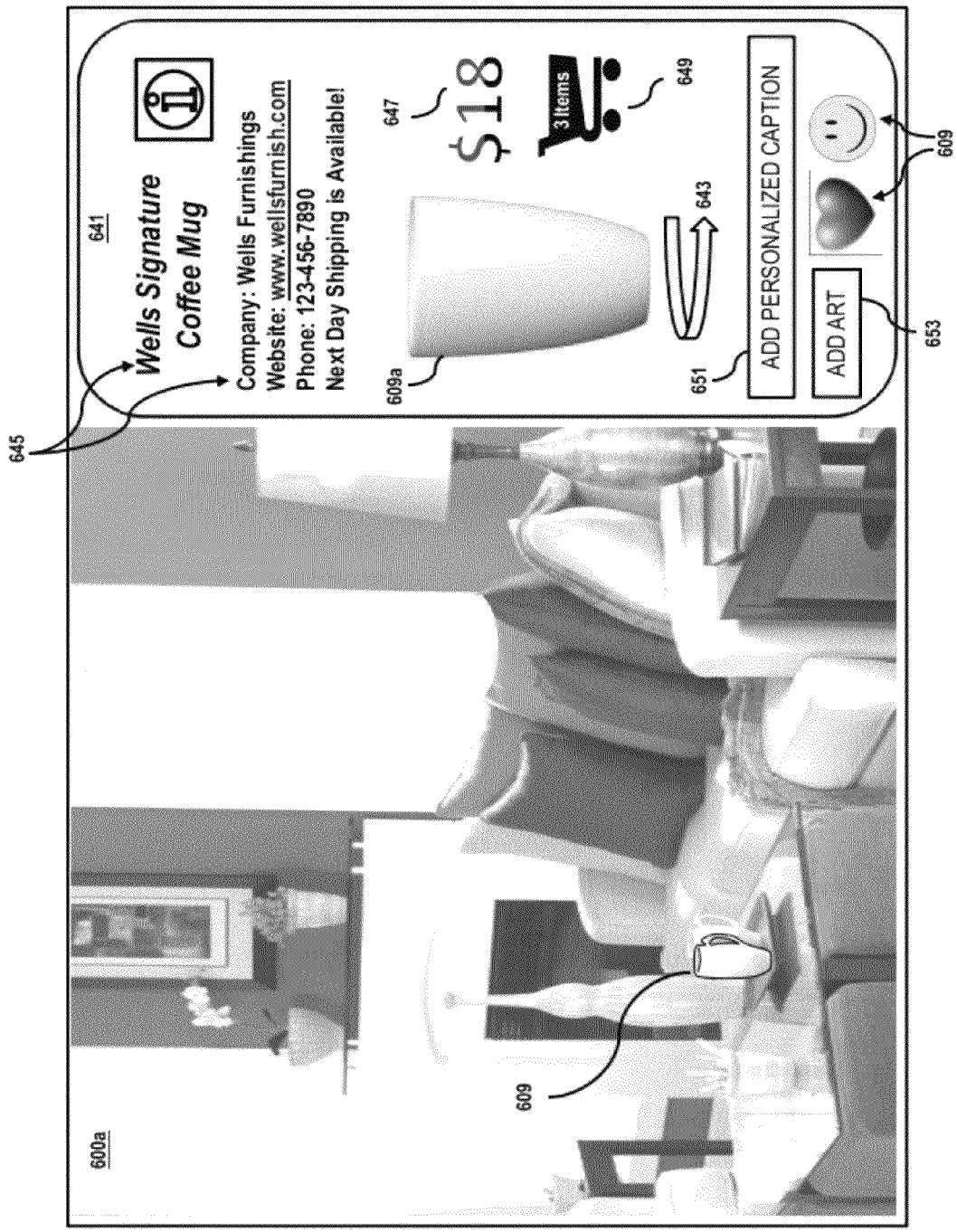

As a next step 503, the STB 300 renders to the display via the widget 621a GUI 640 that includes an interactive virtual display environment 641, as shown in FIG. 6B. The virtual environment 641 is rendered concurrently with the television broadcast 600a content, such that the overall display 600 features both real-time media content as broadcast and the virtual environment 641. In this example, the virtual environment 641 comprises about one third of the overall screen space, although in other implementations, a split screen mode or other presentation option may be employed. It is noted that the virtual environment 641 is executable in connection with the real-time broadcast 600a as opposed to a freeze frame or replayed rendering. This is shown in FIG. 6B wherein the actress 601 of FIG. 6A, representing an initial point in time, is no longer present in the scene of FIG. 6B, representing the current point in time.

As shown, the virtual environment 641 depicts at least a representation of the coffee mug 609, in this case as a 3D model 609a capable of being rotated by the user via a control mechanism 643. Having retrieved details regarding the coffee mug 609 by way of the search engine module 209 or from data repository 213, this information 645 is presented to the user via the virtual environment 641. Details presented may include, but is not limited to, the name of the vendor, product name and type, URL and contact information for the vendor, special feature info, etc. Also shown prominently for display to the user within the environment is the price information 647, as well as a virtual shopping cart 649 for indicating the number of items the user currently has arranged for purchase (e.g., 3 items).

As another feature of the virtual environment, the representation of the coffee mug 609a can be personalized with captions 651 or art 653. Upon selecting the "Add Personalized Caption" button 653, the user is presented with a text entry field or virtual keyboard for enabling them to generate text. The text may be further depicted as an overlay atop the virtual representation of the mug 609a, with appropriately detailed vector scaling, curvature, etc. to depict what the coffee mug 609 would look like upon delivery. Upon selecting the "Add Art" button 653, the user is presented with various icons, graphics, images, etc. that may be may be affixed to/printed upon the coffee mug 609. The art may be further depicted as an overlay atop the virtual representation of the mug 609a, with appropriately detailed vector scaling, curvature, etc. to depict what the coffee mug 609 would look like upon delivery.

The above presented interactions, which includes reviewing data, modifying and manipulating the virtual representation of the item of interest 609, personalization and customization, etc., corresponds to step 505 of FIG. 5. In step 507, the user may place the coffee mug 609a into the shopping cart to facilitate purchase processing. In the context of the virtual environment, this may be performed by the user simply moving the 3D model of the coffee mug 609a into the shopping cart 617. Thereafter, the user may complete the transaction by providing appropriate payment information, deleting items from the shopping cart, adding the items to a wish list, sharing the shopping cart with others, placing the shopping cart/transaction on hold, etc. The shopping cart may be held for a period of time allotted by the interactive platform 101. A reminder may be displayed prior to shopping cart removal, giving the user ample opportunity to act upon the purchase. The customer may also browse through history of items of media content that they have viewed for a period of time allotted. If purchase is however, confirmed, the payment is processed and the order is placed with vendor for delivery to the shipping address indicated by the user.

It is contemplated that the above described interactions and engagements with the coffee mug 609 or associated representation 609a are facilitated via the media manager of the STB 300 in connection with the widget 621/interactive platform 101. Also, in accordance with some embodiments, the widget 621 may feature additional action buttons 625 for enabling various other means of interaction between the user and a selected item of interest. For example, the computing action button 625 of FIG. 6A may enable the user to perform a query regarding a particular item of interest, send an electronic communication to the vendor or other interested party, upload other items for use within the virtual environment relative to a given object model (e.g., a 3D model representative of a saucer upon which the coffee mug 609a may be placed), etc. The capture button 627 may enable the user to capture an image or listing of all of the items featured at the moment of broadcast 600a, obtain a snapshot of specific items as interacted with in the virtual environment 641, etc. The call button 629 may enable the auto-dialing of a vendor or other interested party via telephony network 125 to facilitate over-the-phone purchase processing.

Still further, although not shown, additional actions executable upon media content by way of the widget may include the ability to rotate the screenshot, so as to view items not presently shown in the current view, the ability to alternate to a panoramic view setting to enable more items to be shown, the ability to place information tags on specific items of interest (e.g., price tags, product descriptions) as they are presented as content, etc. Indeed, the widget 621 as presented is exemplary in nature, and may feature various other execution options enabled at the discretion of the content delivery system provider.

According to certain embodiments, the above arrangement and associated processes advantageously enhances user experience, while augmenting the service offerings of a service provider to thereby enable more sources of revenue. The integration of content delivery and online commerce, moreover, provides great convenience for users to engage in electronic commerce without having to boot up a computer to then find the items of interest.

The processes described herein for providing direct user interaction with specific items of content as presented by a content delivery system may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
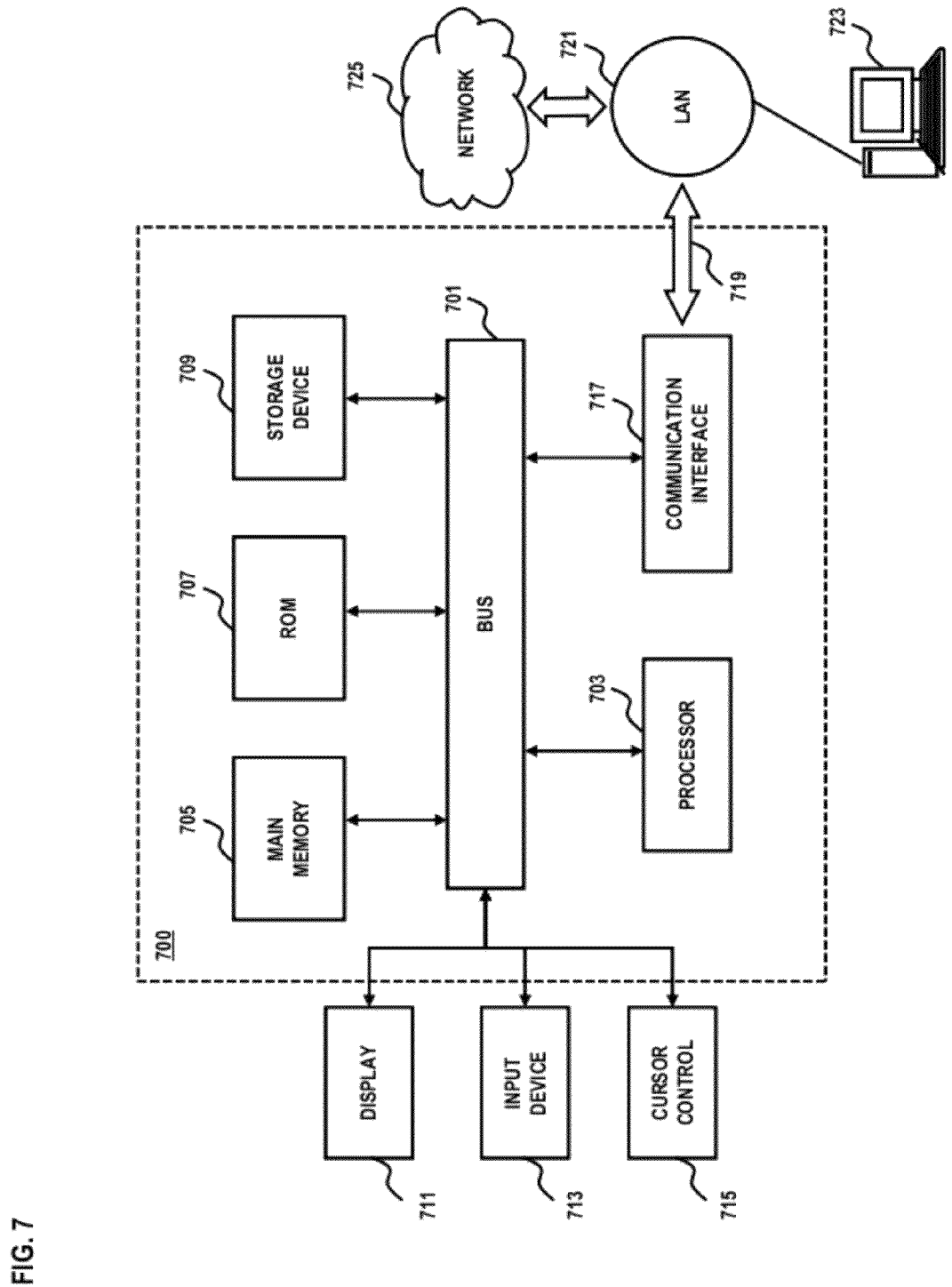
FIG. 7 is a diagram of a computer system that can be used to implement various exemplary embodiments.

FIG. 7 illustrates computing hardware (e.g., computer system) 700 upon which an embodiment according to the invention can be implemented. The computer system 700 includes a bus 701 or other communication mechanism for communicating information and a processor 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to computer-readable storage media ((or non-transitory media)—i.e., non-volatile media and volatile media), and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 8:
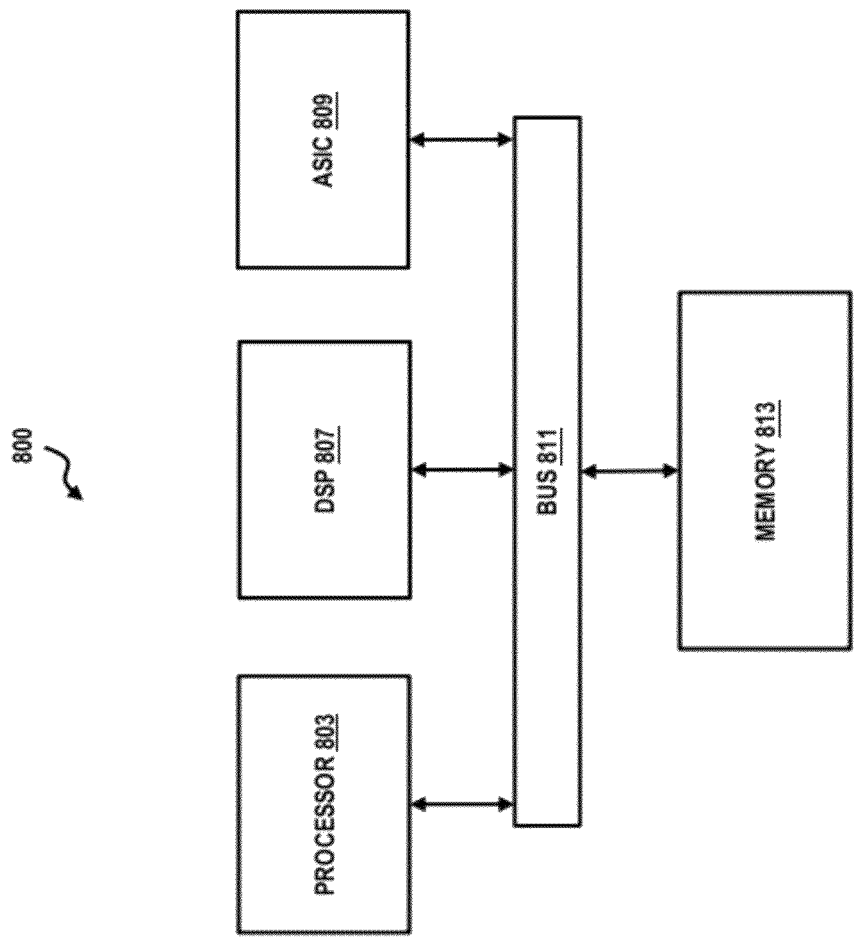
FIG. 8 illustrates a chip set upon which an embodiment of the invention may be implemented.

FIG. 8 illustrates a chip set 800 upon which an embodiment of the invention may be implemented. Chip set 800 is programmed to acquire an address from a user and to display ranked candidate addresses to the user, as described herein and includes, for instance, the processor and memory components described with respect to FIG. 14 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of FIGS. 4 and 5.

In one embodiment, the chip set 800 includes a communication mechanism such as a bus 811 for passing information among the components of the chip set 800. A processor 803 has connectivity to the bus 811 to execute instructions and process information stored in, for example, a memory 813. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 811 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 813 via the bus 811. The memory 813 includes both dynamic memory (e.g., RAM, magnetic disk, writable optical disk, etc.) and static memory (e.g., ROM, CD-ROM, etc.) for storing executable instructions that when executed perform the inventive steps described herein to presenting a slideshow via a set-top box. The memory 813 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
presenting at a graphical user interface broadcast content, via a set-top box, concurrently with a widget, via the set-top box, indicating one or more items specified in the content;
initiating a rotation of a screenshot within the broadcast content to present one or more other items on the graphical user interface;
receiving user input relating to selection of one of the other items;
generating, in response to the user input, a request for purchase information regarding the selected item;
transmitting the request to an interactive platform configured to present an interactive virtual environment along with the content in response to the request for purchase information regarding the selected item, wherein the presentation of the interactive virtual environment and the content comprises presenting an image of the selected item in the graphical user interface, wherein the virtual environment is executable in real-time in connection with the content;
alternating the presentation to a panoramic view setting to include one or more additional items on the graphical user interface; and
presenting on the graphical user interface an avatar of the user applied with the image of the selected item, wherein the avatar resembles physical characteristics of the user.

2. A method according to claim 1, further comprising:
wherein an image within the virtual environment is controlled in response to another user input via the set-top box.

3. A method according to claim 1, wherein the broadcast content includes a current sports event, the updated content is presented at the user interface in real time with the current sports event, the request is generated from a widget presented by the set-top box, and the content includes video.

4. A method according to claim 1, wherein the purchase information regarding the selected item includes one or a combination of the name of the vendor, product name and type, URL, contact information for the vendor, and special features of the product.

5. A method according to claim 1, wherein the image of the selected item is three dimensional, the broadcast content includes a current event, and the avatar applied with the three-dimensional image of the selected item is presented at the user interface in real time with the current event.

6. A method according to claim 1, further comprising:
in response to one or more user inputs, inserting one or more information tags on one or more of the other items on the graphical user interface; and
initiating a rotation of the avatar applied with the three-dimensional image of the selected item on the graphical user interface.

7. A method according to claim 6, wherein the one or more information tags include one or more price tags, one or more product descriptions, or a combination thereof; and
the historical log is maintained by the interactive platform, and the historical log of items of interest includes both items view by the particular user without purchase, and items purchased by the particular user.

8. A method according to claim 1, wherein the presentation of the interactive virtual environment and the content comprises:
presenting a graphical user interface that provides a split-screen including the content in one half of the screen and an image of the selected item in another half of the screen, and the content includes video.

9. An apparatus comprising:

at least one processor; and at least one memory including computer program code, the at least one memory and the computer program code being configured to, with the at least one processor, cause the apparatus at least to:

present at a graphical user interface broadcast content, via a set-top box, concurrently with a widget, via the set-top box, indicating one or more items specified in the content, initiate a rotation of a screenshot within the broadcast content to present one or more other items on the graphical user interface, receive user input relating to selection of one of the other items, generate, in response to the user input, a request for purchase information regarding the selected item, transmit the request to an interactive platform configured to present an interactive virtual environment along with the content in response to the request for purchase information regarding the selected item, wherein the presentation of the interactive virtual environment and the content comprises presenting an image of the selected item in the graphical user interface, wherein the virtual environment is executable in real-time in connection with the content;

alternate the presentation to a panoramic view setting to include one or more additional items on the graphical user interface; and present on the graphical user interface an avatar of the user applied with the image of the selected item, wherein the avatar resembles physical characteristics of the user.

10. An apparatus according to claim 9, wherein the apparatus is further caused to:

present, via the set-top box, a virtual environment including an image of the selected item, wherein the image within the virtual environment is controlled in response to another user input via the set-top box.

11. A method comprising:

processing broadcast content to present at a user interface a plurality of items, wherein broadcast content including at least one movie;

determining that one or more of the items selected by a user in an attempt to find information thereabout is absent from metadata embedded in the content, wherein the information includes purchase information of at least one of the selected items presented in the movie and non-purchase information of one or more human characters presented in the movie and selected by the user;

performing an online search to determine the information about the one or more selected items and human characters;

updating the metadata based on the information;

presenting the updated content at the user interface; and alternating the presentation of the updated content to a panoramic view setting to include one or more additional items on the user interface.

12. A method according to claim 11, further comprising:

receiving a request, from a set-top box, specifying one of the items during presentation of the updated content via the set-top box; and initiating presentation of the purchase information and the non-purchase information to the user interface.

13. A method according to claim 12, further comprising:

initiating a transaction for purchasing the one item in response to input from a user via the set-top box.

14. A method according to claim 12, further comprising:

storing the one item as part of a historical log of items of interest for a particular user.

15. A method according to claim 11, further comprising:

generating a virtual environment for presentation of the one item, wherein the presentation is controlled in response to input from a user via the set-top box.

16. An apparatus comprising:

at least one processor; and at least one memory including computer program code, the at least one memory and the computer program code being configured to, with the at least one processor, cause the apparatus at least to:

process broadcast content to present at a user interface a plurality of items, wherein broadcast content including at least one movie;

determine that one or more of the items selected by a user in an attempt to find information thereabout is absent from metadata embedded in the content, wherein the information includes purchase information of at least one of the selected items presented in the movie and non-purchase information of one or more human characters presented in the movie and selected by the user;

perform an online search to determine the information about the one or more selected items and human characters;

update the metadata based on the information;

present the updated content at the user interface; and alternate the presentation of the updated content to a panoramic view setting to include one or more additional items on the user interface.

17. An apparatus according to claim 16, wherein the apparatus is further caused to:

retrieve item information about the one item in response to the request; and initiate transmission of the item information to the set-top box.

18. An apparatus according to claim 17, wherein the item information relates to purchase of the one item, the apparatus further comprising:

initiating a transaction for the purchase of the one item in response to input from a user via the set-top box.

19. An apparatus according to claim 1, wherein the apparatus is further caused to:

generate a virtual environment for presentation of the one item, wherein the presentation is controlled in response to input from a user via the set-top box.

20. An apparatus according to claim 16, wherein the request is generated from a widget presented by the set-top box, and the content includes video.

* * * * *